(12) United States Patent
Ogren et al.

(10) Patent No.: US 8,020,988 B2
(45) Date of Patent: Sep. 20, 2011

(54) EYEGLASS EARSTEM WITH ENHANCED PERFORMANCE

(75) Inventors: Steven Ogren, Yorba Linda, CA (US); Ryan Anthony Calilung, Irvine, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 12/614,342

(22) Filed: Nov. 6, 2009

(65) Prior Publication Data

US 2011/0109873 A1    May 12, 2011

(51) Int. Cl.
*G02C 5/22*    (2006.01)

(52) U.S. Cl. ........... 351/153; 351/114; 351/121; 16/228

(58) Field of Classification Search .......... 351/111–123, 351/153; 16/228
See application file for complete search history.

(56) References Cited

U.S. PATENT DOCUMENTS

| | | | |
|---|---|---|---|
| 3,923,384 A | 12/1975 | Leblanc | |
| 5,059,017 A | 10/1991 | Bennato | |
| 5,080,476 A * | 1/1992 | Monin | .......... 351/119 |
| 5,231,429 A | 7/1993 | Kanda | |
| 5,359,370 A | 10/1994 | Mugnier | |
| 5,555,037 A | 9/1996 | Canavan | |
| 5,631,718 A | 5/1997 | Markovitz et al. | |
| 5,666,181 A | 9/1997 | Conway | |
| 5,673,095 A | 9/1997 | Conway | |
| 5,708,489 A | 1/1998 | Jannard | |
| 5,805,261 A * | 9/1998 | Houston et al. | ............... 351/126 |
| 5,835,185 A | 11/1998 | Kallman et al. | |
| 5,959,715 A * | 9/1999 | Jaffelin | .......... 351/113 |
| 5,987,702 A | 11/1999 | Simioni | |
| 6,048,062 A | 4/2000 | Chow | |
| 6,106,116 A | 8/2000 | Houston et al. | |
| 6,231,181 B1 | 5/2001 | Swab | |
| 6,250,756 B1 | 6/2001 | Jannard | |
| 6,336,250 B1 | 1/2002 | Takeda et al. | |
| 6,886,934 B2 * | 5/2005 | Asman et al. | ................. 351/112 |
| 7,210,776 B2 | 5/2007 | Jannard et al. | |
| 7,367,669 B2 | 5/2008 | Jannard et al. | |

FOREIGN PATENT DOCUMENTS

| | | |
|---|---|---|
| EP | 0950914 | 10/1999 |
| WO | WO 94/11774 | 5/1994 |
| WO | WO 2007/113396 | 10/2007 |

* cited by examiner

*Primary Examiner* — Huy K Mai
(74) *Attorney, Agent, or Firm* — Knobbe Martens Olson & Bear, LLP

(57) ABSTRACT

An earstem for an eyeglass is provided that can exhibit a dampening effect as the earstem is over-rotated or deflected from a deployed position to a deflected position. In some embodiments, the earstem can comprise a suspension component and a rigid elongate body. The suspension component can be attached to the rigid elongate body along a posterior portion of the suspension component. The rigid elongate body can pivot relative to the frame to a deployed position and further, beyond the deployed position. However, pivoting of the rigid elongate body beyond the deployed position causes deflection of the suspension component, which dampens further pivoting of the rigid elongate body.

34 Claims, 11 Drawing Sheets

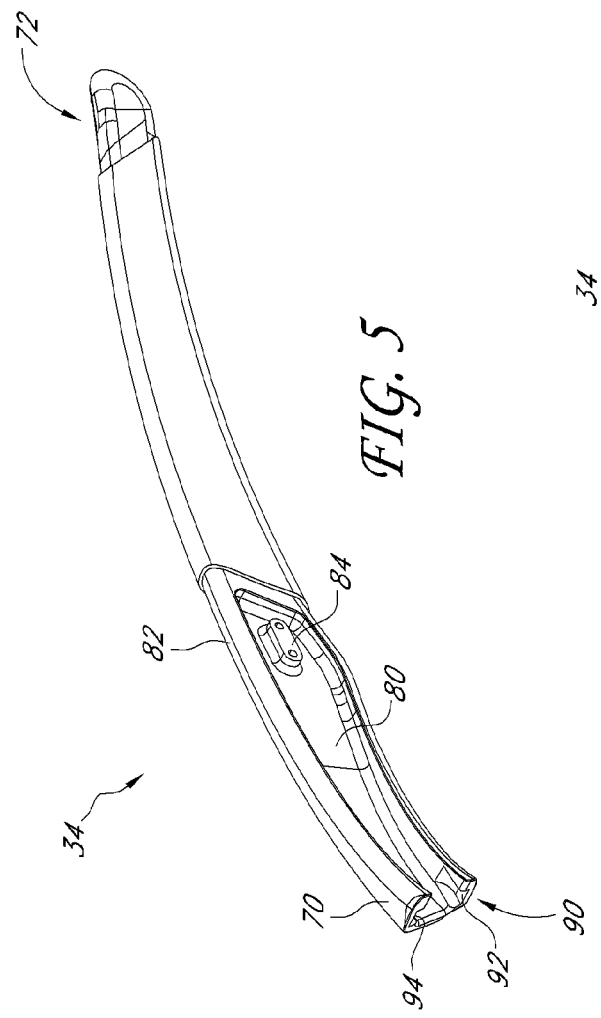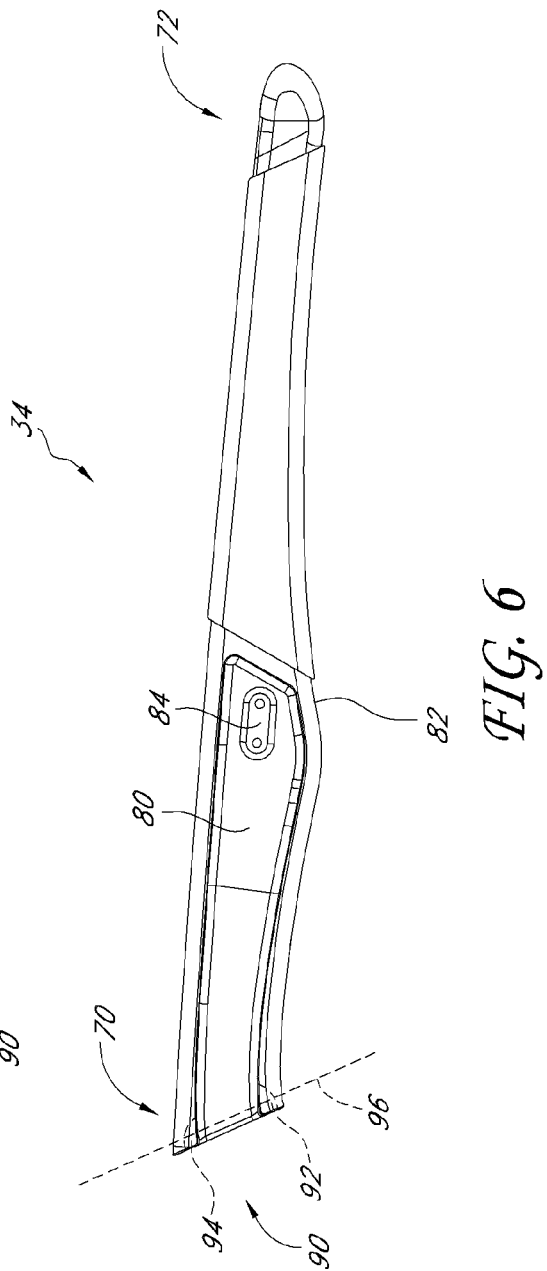

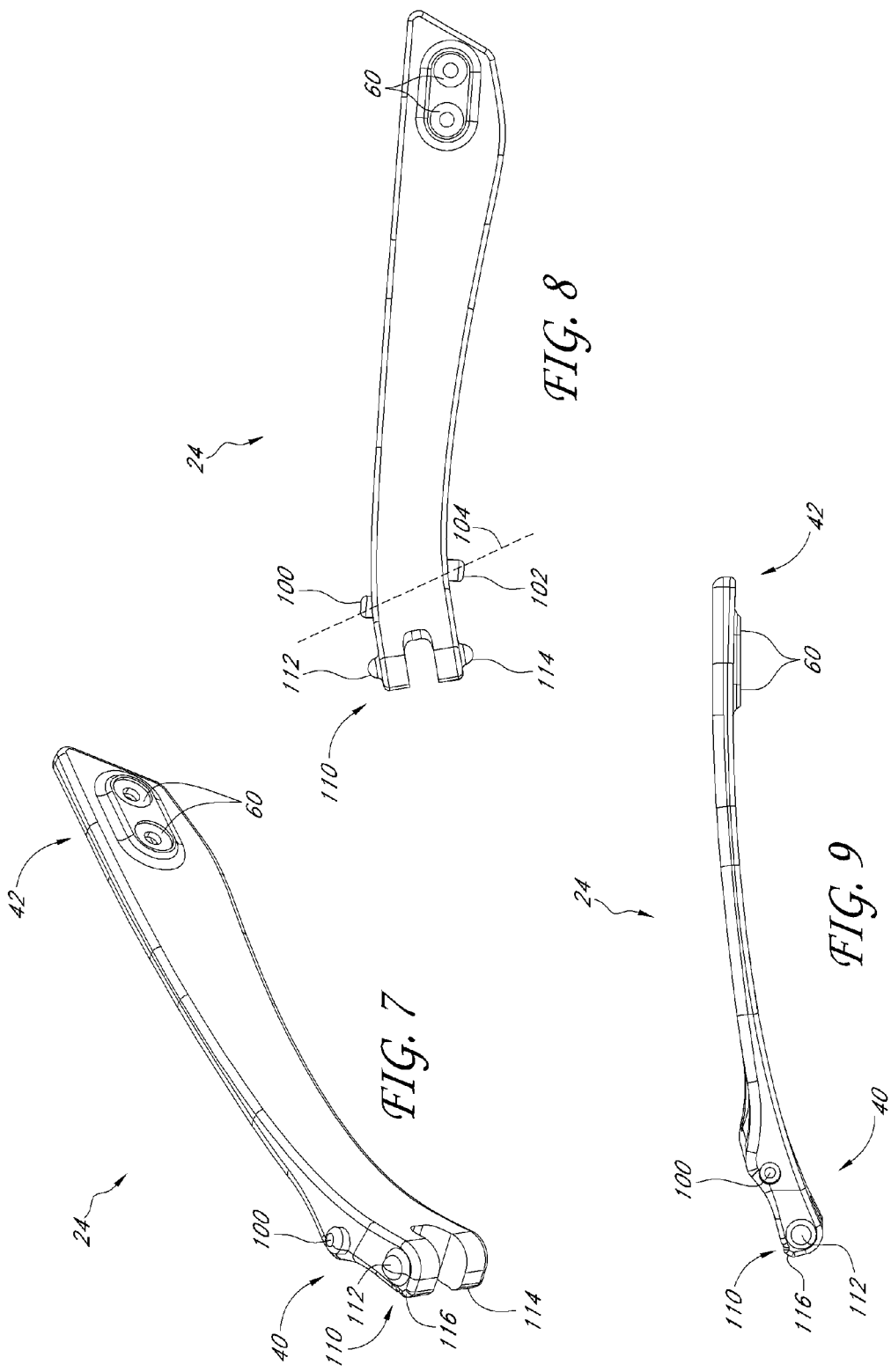

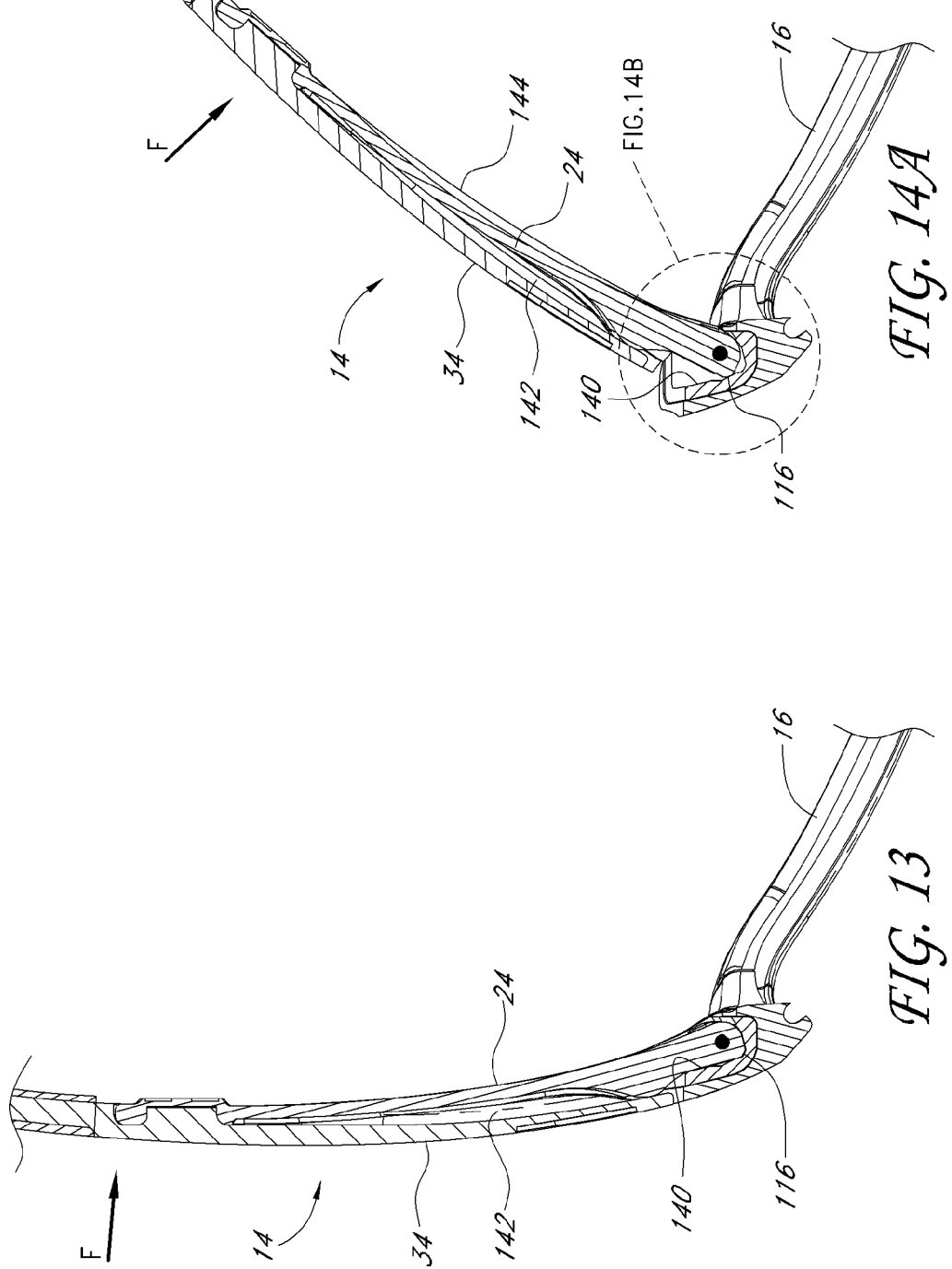

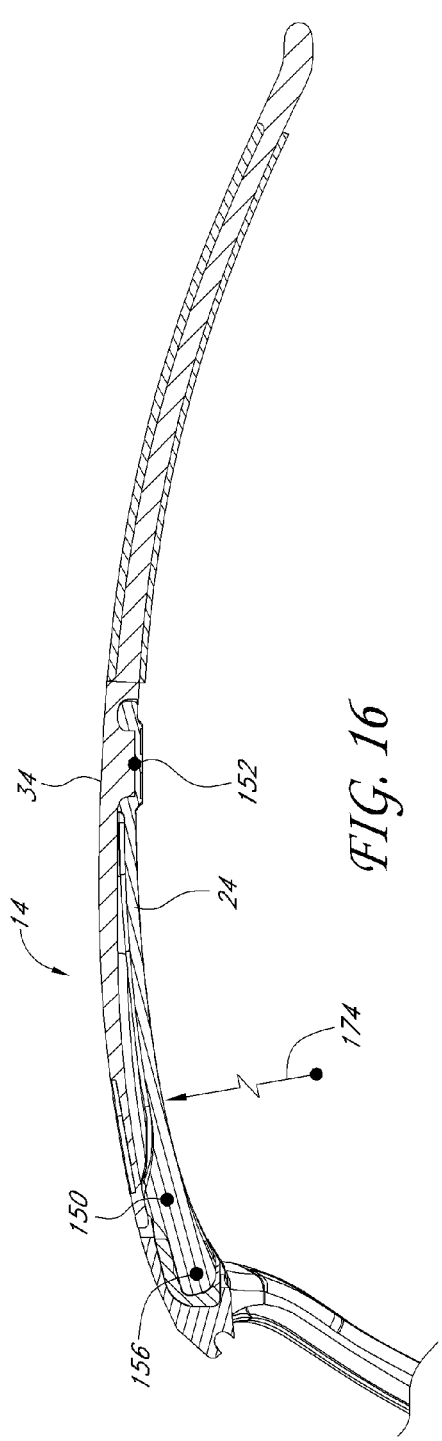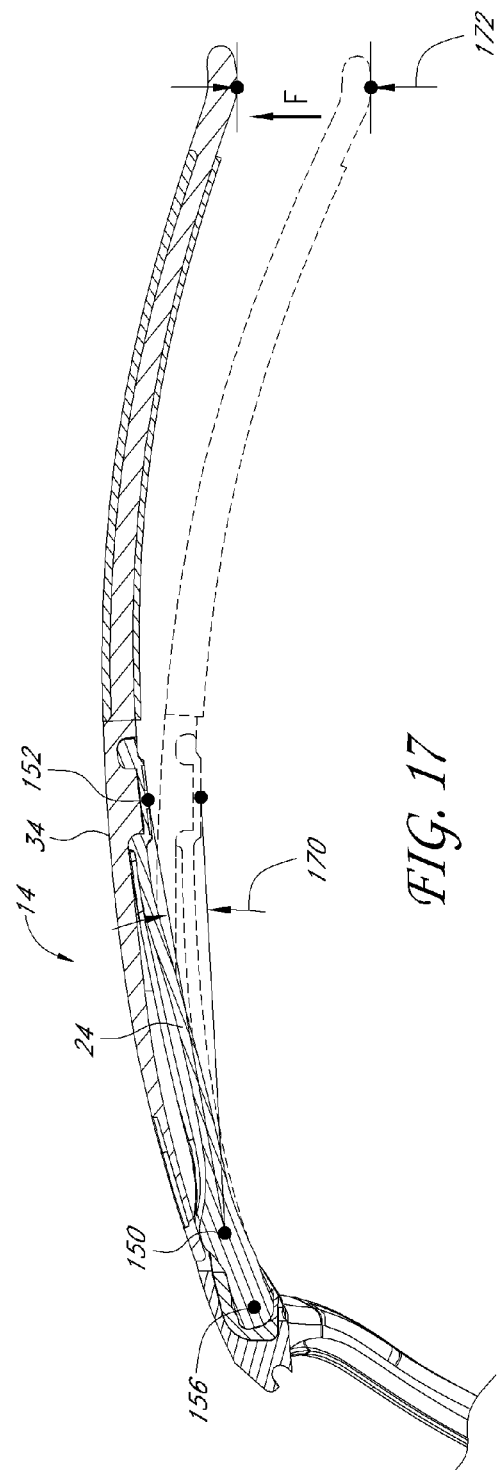

EYEGLASS EARSTEM WITH ENHANCED PERFORMANCE

BACKGROUND

1. Field of the Inventions

The present inventions relate generally to eyewear and more specifically to earstems and earstem connection systems for eyewear.

2. Description of the Related Art

A wide variety of improvements have been made in recent years in the eyewear field, particularly with respect to eyewear intended for use in active sports or as fashion sunglasses. These eyewear designs accomplish a variety of functional advantages, such as maximizing interception of peripheral light, reducing optical distortion and increasing the wearer's comfort level, compared to previous active sport eyewear.

Eyeglass fit and comfort has been addressed in several ways, including varying eyeglass frame size, minimizing eyeglass weight, modifying the manner in which earstems engage ears of the wearer, and utilizing nosepiece and ear-contacting materials that are comfortable for extended use, to name a few.

Eyeglass fit and comfort has been determined at least in part due to the material of which the eyeglass is made. For example, plastic or injection molded frame eyeglasses are often more flexible than metal frame eyeglasses, and therefore could provide lighter overall weight and greater flexibility than a metal frame eyeglass. Although metal frame eyeglasses have been improved in some ways, such improvements may have only moderately affected the flexibility and fit of eyeglasses. Prior art eyeglass designs do not adjust well over a range of head sizes and shapes.

Moreover, various other improvements have been made to enhance the durability and strength of eyeglasses. For example, various durable eyeglass designs have been developed that enable eyeglasses to be sturdy even during accidents, impact, stress, and other forms of use or misuse. Further, lenses have also been developed that have enhanced ballistic protection. Thus, an eyeglass can be generally resistant to breaking, bending, or otherwise becoming unusable. However, such eyeglasses often sacrifice comfort and fit for durability and strength.

SUMMARY

In some embodiments, to improve the fit and comfort of the eyeglass, various eyewear designs have been provided which reduce the weight of the eyeglass, allow the wearer to customize the fit of the eyeglass, or otherwise seek to alleviate pressure and discomfort during use. Further, various other advances have been made to improve the durability of the eyeglass and resist breakage.

In some embodiments, a self-customizing eyewear design can be worn on a variety of head sizes and shapes and reduce lateral pressure on the temples while permitting increased durability and sturdiness and providing qualities associated with rigid or high-stiffness materials. In some embodiments, a tunable earstem design allows a rigid earstem to adjust to a corresponding head size and shape and/or enhance retention and performance of the eyeglass.

For example, some embodiments disclosed herein reflect the realization that metal frame eyeglasses sometimes provide limited adjustability for a wearer and usually do not achieve an optimal fit over a range of different head sizes and shapes while providing a durable design. As a result, a given metal frame eyeglass size may comfortably fit onto a narrow head and make it easier for a user to put the eyeglasses on. However, such an eyeglass generally has only a limited range of adjustability and flexibility and therefore only fits a very small range of head sizes and shapes. Further, such an eyeglass may often exhibit poor durability in cases of misuse, impact, or the like. In other words, such an eyeglass can be deformed in such situations, thus causing the earstems and frame to be misaligned with respect to their original orientation.

Therefore, some of the embodiments disclosed herein reflect the realization that metal frame eyeglasses can be improved by modifying the earstems such that the earstems exhibit flexural properties that are similar, in some embodiments, to those exhibited by a plastic or injection molded earstem while providing a design that enhances the durability of the eyeglass.

It is noted that although some embodiments are discussed as being made from metal, any of the embodiment disclosed herein can be made of metal, plastic, and/or composite materials, etc., or some combination thereof. Thus, although many of the embodiments provide an effective solution to providing a metal earstem with enhanced performance, embodiments can also be made of plastic, composite, or combinations of materials.

Accordingly, various embodiments of an eyeglass are provided that comprise a frame and at least one earstem assembly that can be pivotable with respect to the frame. Some embodiments can be provided that utilize a rigid frame and a rigid earstem assembly. Further, the earstem assembly can comprise a flexible, resilient suspension component and an earstem. In some embodiments, the earstem can be indirectly connected to the frame by the suspension component. In some embodiments, the earstem assembly can be configured such that the earstem can be directly coupled to the frame, and/or the suspension component can be directly coupled to the frame.

In addition, some embodiments can incorporate at least one of a biasing mechanism, a dynamic dampening or deflection control mechanism, and a breakaway mechanism. Further, some embodiments incorporate a plurality of these features.

In some embodiments, the suspension component can be coupled to an end of the frame and to the earstem in a manner that allows the earstem to deflect from a deployed or fully open position in order to accommodate a larger head size or additional force on or movement of the earstem. In some embodiments, the earstem can be deflected relative to the frame while generally maintaining its shape and configuration. In other words, the shape of the earstem can remain generally constant while the earstem is deflected with respect to the frame.

Some embodiments can be provided with a breakaway mechanism, which can be especially advantageous for embodiments that use rigid materials. In this regard, rather than exceeding the yield stress of a rigid component, the breakaway mechanism can enable the component to be temporarily detached from the eyeglass. For example, if a force exerted on the earstem exceeds a given maximum allowable force, the suspension component can be configured to disconnect from the end of the frame, thus avoiding bending or inelastic deflection of the earstem. Subsequently then, the suspension component and the earstem can be reattached to the frame and assume the same original orientation prior to the application of the excessive force.

In some embodiments, the suspension component can be rotatably or pivotally attached to the frame. In this regard, the suspension component can be configured to have a rotational range between a stowed position and a deployed position.

Some embodiments can comprise a biasing mechanism. In some embodiments, at least one of the suspension component and the frame can comprise one or more structures that limit rotation of the suspension component between the stowed position in the deployed position.

In some embodiments, the suspension component can be fixed to or monolithically formed with the frame. For example, the suspension component may be formed monolithically with the frame and/or include a flexible point that allows limited movement of the earstem assembly relative to the frame while preventing the earstem assembly from being fully pivoted inwardly towards the frame to a stowed position.

For example, an anterior portion of the suspension component can comprise a projection or other structure configured to urge the suspension component to one of a stowed position and a deployed position. When the suspension component is rotated to a position between the stowed position and the deployed position, the suspension component can tend to move or accelerate towards one of the stowed position and the deployed position rather than remaining in an intermediate position. Thus, the configuration of the anterior portion of the suspension component can be designed to interact with an interior structure or surface of the end of the frame such that the suspension component is biased to either the stowed position or the deployed position.

Further, some embodiments can comprise a dynamic dampening or bend control mechanism. For example, in some embodiments wherein the suspension component is rotatably attached to the frame, the suspension component can be deflectable upon exertion of additional force when rotated to the deployed position. In some embodiments, although the suspension component can be generally constrained against further rotation (e.g., by an interference fit at the pivot point of the suspension component), at least a portion of the suspension component can deflect with respect to the deployed position.

Additionally, some embodiments can be configured such that the earstem attaches to the suspension component at one or more points or locations. The attachment between the earstem and the suspension component can comprise one or more pivot points where the earstem and the suspension component can pivot with respect to each other and/or one or more fixed points at which the earstem in the suspension component cannot experience movement relative to each other.

For example, the earstem and the suspension component can be coupled to each other in some embodiments on at least two points. A first or anterior point can be a pivot point, and a second or posterior point can be a fixed point. In some embodiments, the suspension component (and not the earstem) can be directly coupled to the frame. Further, in some embodiments, the suspension component can be rotatably coupled to the frame. In this regard, the earstem can pivot about the first or anterior point while causing deflection of the suspension component at the second or posterior point.

In some embodiments, the portion of the earstem and the portion of the suspension component disposed between the first or anterior point and the second or posterior point can be curved or arcuately shaped. In this manner, the earstem can rotate about the first or anterior point while causing deflection at the second or posterior point. In some embodiments, the portion of the suspension component disposed between the first or anterior point and the second or posterior point can bow or deflect outwardly with respect to the earstem. In this manner, the suspension component can facilitate deflection of the earstem and provide an increasing or dynamic resistance to deflection thereof.

In addition, some embodiments can be configured to comprise a biasing mechanism and a dynamic dampening mechanism. In this regard, while the biasing mechanism would tend to urge the earstem assembly of the eyeglass to one of the stowed or deployed positions, the dynamic dampening mechanism would tend to create a controlled and smooth movement of the earstem assembly.

Accordingly, the present inventions relate to a variety of earstem configurations that provide enhanced performance. The earstem assembly can comprise at least one flexible portion and at least one relatively rigid portion or earstem that each can be modified to control one or more characteristics of the deflection of the earstem. Some of the characteristics of the deflection of the earstem can include the range of deflection, the number of deflection zones or points, the stiffness of the earstem, the deflection mode, and the structural constraints, to name a few. As a result, some of the embodiments disclosed herein can be implemented to provide an eyeglass that provides a customized fit for many different wearer head sizes or shapes.

In accordance with some embodiments, an eyeglass earstem assembly is provided that can comprise a flexible suspension component and a rigid elongate body. The flexible suspension component can have an anterior end and a posterior end. The anterior end of the suspension component can be pivotally coupled relative to an eyeglass frame. The flexible suspension component can be constrained against rotation relative to the eyeglass frame upon reaching a deployed position.

The rigid elongate body can have an anterior end and a posterior end. The anterior end of the rigid elongate body can be pivotally coupled relative to the eyeglass frame. The rigid elongate body and the suspension component can be attached to each other at a point posterior to the anterior ends of the rigid elongate body and the suspension component. The rigid elongate body can be operative to rotate relative to the eyeglass frame beyond the deployed position. In this regard, upon rotation of the rigid elongate body beyond the deployed position, the attachment between the rigid elongate body and the flexible suspension component can cause an opposing deflection of the flexible suspension component which can dampen further rotation of the rigid elongate body relative to the eyeglass frame.

In some implementations, the posterior end of the flexible suspension component can be coupled to the rigid elongate body. In some embodiments, the flexible suspension component can be approximately half the length of the rigid elongate body, and in some embodiments, the flexible suspension component can be greater than or equal to about one-quarter length of the elongate body and/or less than or equal to about one-half of the length of the elongate body. Further, the flexible suspension component can be pivotally coupled to the eyeglass frame.

Additionally, the rigid elongate body can be pivotally coupled to the flexible suspension component adjacent the anterior end thereof. In some implementations, the flexible suspension component can indirectly couple the rigid elongate body to the eyeglass frame.

Further, in some implementations, the anterior end of the suspension component can be configured to engage a portion of the eyeglass frame to limit relative rotation thereof. For example, the anterior end of the suspension component can comprise a protrusion that engages a surface of the eyeglass frame to limit relative rotation thereof.

The earstem assembly can also be configured such that the suspension component and/or the rigid elongate body define a generally arcuate shape. Further, the suspension component can be configured to increasingly dampen and/or provide resistance to rotation of the rigid elongate body upon continued rotation beyond the deployed position. Furthermore, the rigid elongate body can rotate beyond the deployed position to a deflected position. Rotation of the rigid elongate body can be generally constrained upon reaching the deflected position.

In accordance with some embodiments, an earstem assembly is provided that can comprise a flexible elongate body and a rigid elongate body. The flexible elongate body can have an anterior end and a posterior end. The anterior end can be pivotally coupled to the frame at a first pivot point. Further, the rigid elongate body can be pivotally coupled to the flexible elongate body adjacent to the anterior end thereof at a second pivot point. The rigid elongate body can be coupled to the flexible elongate body at a point posterior to the anterior end of the flexible elongate body. The rigid elongate body can be rotated about the second pivot point to move from a deployed position to a deflected position.

In some embodiments, an anterior portion of the rigid elongate body can be curved. Further, the flexible elongate body can be positioned adjacent to the rigid elongate body in the deployed position, and the flexible elongate body can be separated from the rigid elongate body along at least a portion thereof in the deflected position. Moreover, the flexible elongate body can be generally constrained against rotation when the rigid elongate body moves from the deployed position to the deflected position. In some implementations, the posterior end of the flexible elongate body can be coupled to the rigid elongate body at approximately a midpoint of the rigid elongate body.

Some embodiments also provide for an eyeglass that comprises a frame and a pair of earstems coupled to and extending from the frame. Each earstem can comprise a suspension component and a rigid elongate body. The suspension component can interconnect the rigid elongate body to the frame and can be operative to pivot relative to the frame until reaching a deployed position. The rigid elongate body can be operative to pivot relative to the frame beyond the deployed position. The suspension component can be attached to the rigid elongate body along a posterior portion of the suspension component such that pivoting of the rigid elongate body beyond the deployed position causes deflection of the suspension component to dampen further pivoting of the rigid elongate body.

The eyeglass can be configured such that the suspension component is pivotally coupled to the eyeglass frame. Further, the rigid elongate body can be pivotally coupled to the suspension component adjacent an anterior end of the suspension component. An anterior end of the suspension component can also be configured to engage a portion of the frame to limit relative rotation thereof. In some embodiments, the frame can be configured to support dual lenses or a unitary lens. The lenses of the eyeglasses can have many different geometries and can be made of many types of materials, including glass or polymers. Further, the frame can comprise full or partial orbitals configured to support dual lenses or a unitary lens.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures:

FIG. 5 is a perspective view of a rigid elongate body or earstem of the earstem assembly of the eyeglass shown in FIG. 1.

FIG. 6 is a side view of the rigid elongate body or earstem shown in FIG. 5.

FIG. 7 is a perspective view of a flexible elongate body or suspension component of the earstem assembly of the eyeglass illustrated in FIG. 1.

FIG. 8 is a side view of the flexible elongate body or suspension component illustrated in FIG. 7.

FIG. 9 is a top view of the flexible elongate body or suspension component illustrated in FIG. 7.

FIG. 13 is a cross-sectional top view of the earstem assembly of the eyeglass illustrated in FIG. 1 wherein the earstem assembly is in a deployed position.

FIG. 14A is a cross-sectional top view of the earstem assembly of the eyeglass illustrated in FIG. 1, wherein the earstem assembly is in an intermediate open position.

FIG. 16 is a cross-sectional top view of the earstem assembly of the eyeglass illustrated in FIG. 1, wherein the earstem assembly is the deployed position.

FIG. 17 is a cross-sectional top view of the earstem assembly of the eyeglass illustrated in FIG. 1, wherein the rigid elongate body or earstem of the earstem assembly has been moved to a deflected position.

DETAILED DESCRIPTION

Figure 1:
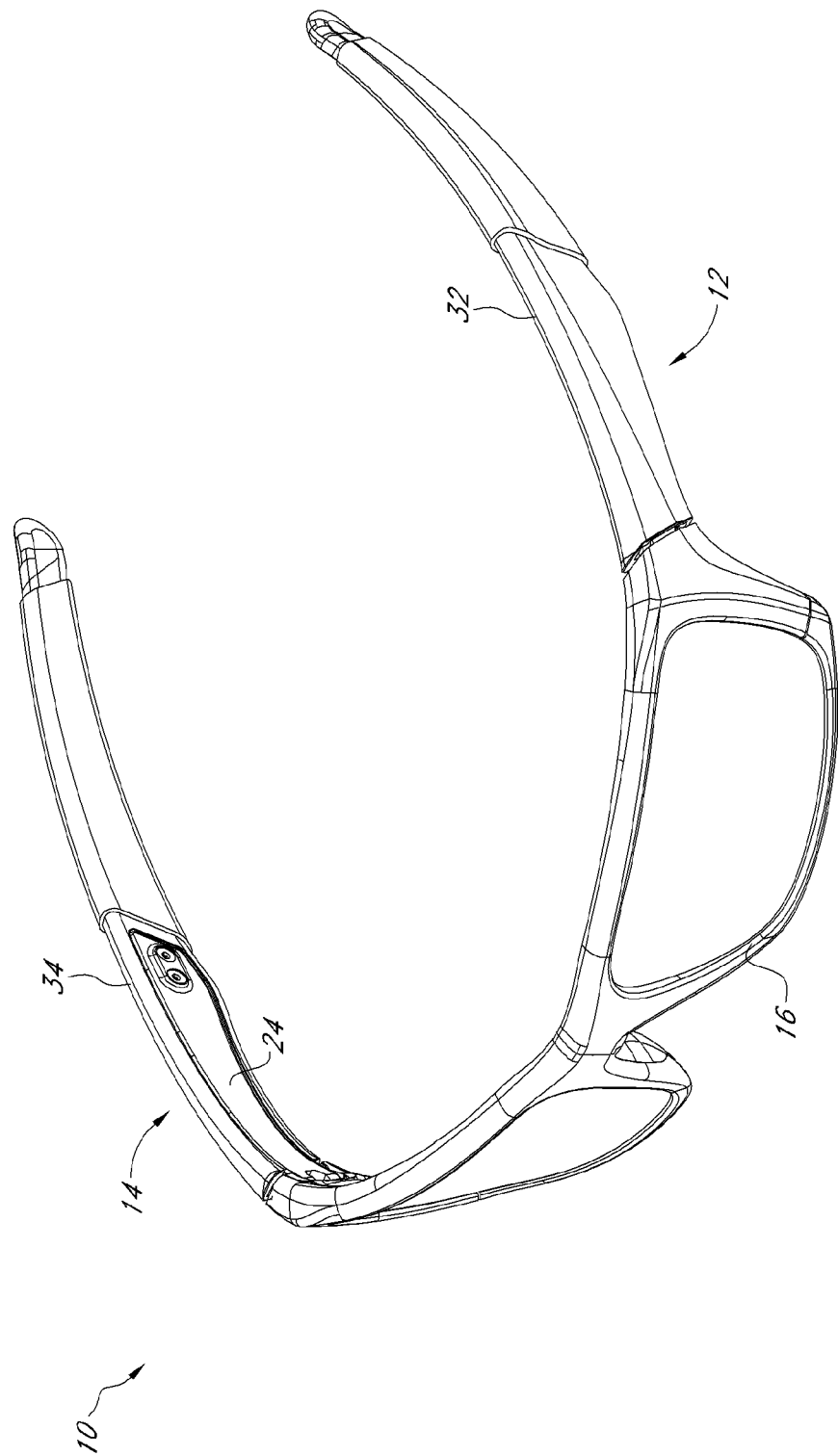
FIG. 1 is a front perspective view of an eyeglass in accordance with an embodiment of the present inventions.

While the present description sets forth specific details of various embodiments, it will be appreciated that the description is illustrative only and should not be construed in any way as limiting. Additionally, it is contemplated that although particular embodiments of the present inventions may be disclosed or shown in the context of dual lens eyewear systems, embodiments can be used in both unitary and dual lens eyewear systems. Further, it is contemplated that although particular embodiments of the present inventions may be disclosed or shown in the context of frames having full orbitals, such embodiments can be used with frames having full or partial orbitals, partial frames, or rimless frames. Furthermore, various applications of such embodiments and modifications thereto, which may occur to those who are skilled in the art, are also encompassed by the general concepts described herein.

Some embodiments disclosed herein are operative to provide adjustability and optimal fit over a wide range of different head sizes and shapes. An eyeglass can be fabricated using metals or other stiff materials that may have desirable properties while nevertheless enabling the eyeglass to provide desirable flexural properties in the earstems thereof. For example, titanium, carbon fiber, aluminum, and other such materials provide excellent mechanical properties while being lightweight. Indeed, various metals and rigid materials can be used to form the eyeglass, thus providing exceptional rigidity, durability, and wear resistance. However, rigid materials function very poorly in accommodating a wide range of head sizes and shapes. Thus, various embodiments disclosed herein enable the use of rigid materials such as metals, composites, and the like in eyewear while providing earstem flexibility.

Various embodiments are provided in which the eyeglass has a metal frame and is operative to provide superior adjustability and flexibility over a wide range of head sizes and shapes, comparable to that provided by a plastic eyeglass frame. Nevertheless, various features and aspects disclosed herein can be used in eyeglasses fabricated from any material, whether the eyeglass is made from plastic, composite, metal, or any combination thereof.

Therefore, some embodiments disclosed herein reflect the realization that metal frame eyeglasses can be improved by modifying the earstems such that the earstems exhibit flexural properties similar to, and in some cases exceeding, those exhibited by a typical plastic or injection molded earstem. Further, some embodiments provide for a rigid metal earstem that is operative to flex from a deployed position to a deflected position to allow the earstem to adjust to the natural and variable shape of a variety of head sizes and shapes.

Further, although some embodiments are discussed as being made from metal, any of the embodiments disclosed herein can be made of metal, plastic, and/or composite materials. Thus, although many of the embodiments provide an effective solution to providing a metal earstem with enhanced performance, embodiments can also be made of plastic, composite, or combinations of materials.

Further, while eyeglasses made of rigid materials present several design and manufacturing problems, the teachings and disclosure herein enable a person of skill in the art to design an eyeglass having desirable aesthetic properties and construct an exceptionally functional platform that provides superior comfort and adaptability for wearers.

In the present description, various mechanical terms may be used in reference to deformation and/or other structural characteristics of components of the embodiments disclosed herein. As used herein, the term "stiffness" or "bending stiffness" can be defined as the resistance of an elastic body to deformation by an applied force. In this regard, stiffness may not be the same as the "flexural or elastic modulus;" stiffness relates to a property of a solid body, and flexural or elastic modulus relates to a property of a material of the solid body.

In other words, stiffness is a property of the solid body that is dependent on the material and the shape and boundary conditions. For example, with reference to embodiments disclosed herein, the bending stiffness "EI" of an earstem relates the applied bending moment to the resulting deflection of the earstem. The bending stiffness is the product of the elastic modulus "E" of the earstem material and the area moment of inertia "I" of the earstem cross-section. Further, when a plurality of components, or a single component comprising a plurality of materials, are used in the earstem, the equation is modified accordingly to account for the individual components and material variations. In a basic illustration, according to elementary beam theory, the relationship between the applied bending moment M and the resulting curvature κ of the beam is:

$$M = EI_\kappa = EI \frac{d^2 w}{dx^2}$$

where w is the deflection of the beam and x the spatial coordinate. Accordingly, this is one example of how the bending stiffness of embodiments of the earstem can be measured. Other ways known to those of skill in the art can also be used.

FIG. 1 illustrates an embodiment of an eyeglass 10 having enhanced earstem performance. The eyeglass 10 can comprise a pair of earstem assemblies 12, 14 and a frame 16. As will be discussed in further detail below, the eyeglass components, such as the earstem assemblies 12, 14 and the frame 16, can be formed from rigid materials, such as metal. Thus, the eyeglass 10 can be configured to provide a desirable look, weight, or stiffness. However, according to various principles and some embodiments discussed herein, the earstem assemblies 12, 14 can exhibit exceptional deflective properties and durability in accommodating a variety of head shapes and sizes, even during rugged use.

Figure 2:
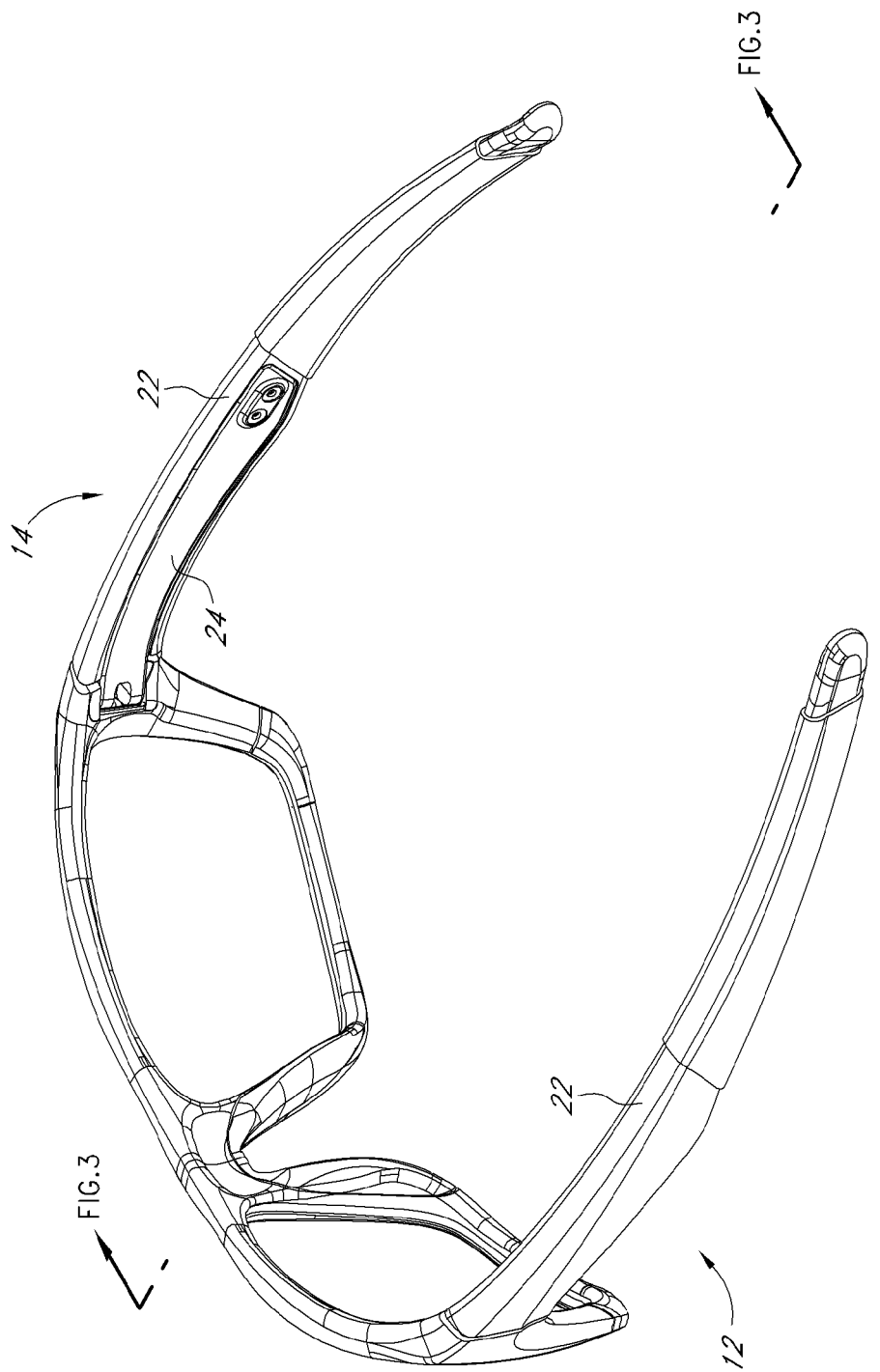
FIG. 2 is a rear perspective view of the eyeglass illustrated in FIG. 1.
Figure 3:
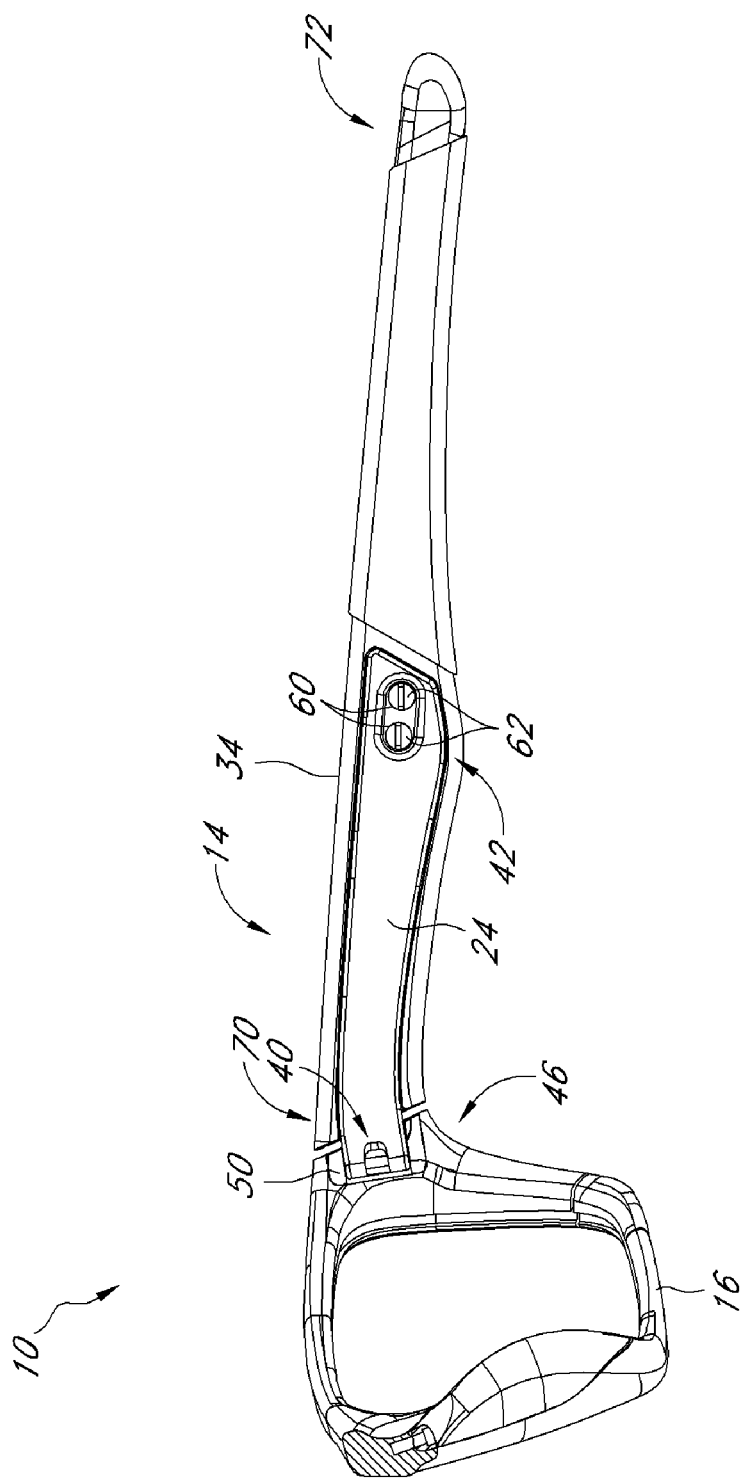
FIG. 3 is a cross-sectional side view of the eyeglass illustrated in FIG. 1 taken along lines 3-3 of FIG. 2.

As shown in FIGS. 1-3, the earstem assemblies 12, 14 can be configured to comprise one or more components. In some embodiments, these components can be formed from distinct materials. Further, in accordance with some embodiments, these components can be replaceable or interchangeable in order to allow a user to customize the look and/or feel of the eyeglass, or replace or repair damaged or worn components. The components can be configured to interact such that the individual properties of the components can collectively provide advantageous properties for the earstem assemblies 12, 14.

For example, in accordance with an embodiment the earstem assemblies 12, 14 can each comprise a suspension component or flexible elongate body 22, 24 and an earstem or rigid elongate body 32, 34. The flexible elongate bodies 22, 24 can be formed from a flexible, resilient material. For example, the flexible suspension components 22, 24 can be formed from plastic, composites, and the like. Further, the earstems 32, 34 can be formed from a rigid material. For example, the earstems 32, 34 can be formed from metal, such as aluminum, or rigid plastics and composites. The earstems 32, 34 may exhibit some flexibility. However, in some embodiments, the flexibility of the suspension components 22, 24 is greater than the flexibility of the earstems 32, 34. The terminology "flexible" and "rigid" as applied to the suspension components 22, 24 and the earstems 32, 34 can be relative to the components 22, 24, 32, 34.

Referring now to FIG. 3, the suspension component 24 can be coupled to the frame 16. The suspension component 24 can be formed monolithically or separately from the frame 16. Thus, some embodiments can be provided in which the suspension component 24 extends in a deployed position from the eyeglass 10 and does not fold inwardly toward a stowed position relative to the eyeglass 10. As will be discussed further herein, various principles and embodiments can be implemented with either configuration.

In the illustrated embodiment of FIG. 3, the suspension component 24 can comprise an anterior portion 40 and a posterior portion 42. As illustrated, the anterior portion 40 of the suspension component 24 can be pivotally coupled to an end 46 of the frame 16. In some embodiments, the end 46 of the frame 16 can be configured to comprise a receptacle 50. As discussed further below, the receptacle 50 can be formed separately from the frame 16. In some embodiments, the receptacle 50 and the frame 16 can be formed from different materials. For example, the receptacle 50 can advantageously be formed from a resilient material, such as plastic, that can provide beneficial properties for a hinge-joint interaction with the earstem assembly 12. Further, the receptacle 50 can be interchangeable and/or customizable to allow the wearer to select a receptacle having a preferred material or geometric property. However, in some embodiments, the receptacle 50 can be formed monolithically with the frame 16.

Additionally, as also shown in FIG. 3, the suspension component 24 can be coupled to the earstem 34 along the posterior portion 42 thereof. For example, the suspension component 24 can be mechanically attached to the earstem 34. The attachment or coupling of the suspension component 24 to the earstem 34 can be accomplished using a moveable connection, such as by a snap fit, mechanical fasteners, adhesives, or other forms of bonding the suspension component 24 to the earstem 34. The suspension component 24 can be coupled to the earstem 34 along only a portion of the length or at a discrete point of the suspension component 24.

For example, as shown in FIG. 3, the suspension component 24 can comprise one or more apertures 60 through which one or more fasteners 62 can pass to couple the posterior portion 42 of the suspension component 24 to the earstem 34. In an embodiment wherein the suspension component 24 comprises apertures 60, the fasteners 62 can comprise mechanical fasteners such as screws, clips, mating protrusions, heat staking, mattel pins, interference pins, dovetails with snap, snap tabs, christmas/pine tree one-time fasteners, etc. However, in some embodiments, the suspension component 24 can be attached to the earstem 34 using a variety of other types of fastening or bonding means, including products and methods such as adhesive bonding, ultrasonic bonding, welding, overmolding or comolding, interference fitting, etc.

FIG. 3 also illustrates that in some embodiments, the eyeglass 10 can be configured such that only the suspension component 24 is coupled to the frame 16. In such embodiments, an anterior portion 70 of the earstem 34 can be coupled or attached to the suspension component 24. Thus, the earstem 34 can be coupled or attached to the suspension component 24 on at least one discrete point.

In some embodiments, both the earstem 34 and the suspension component 24 can be constrained to rotate about a rotation axis or axes relative to the frame 16. The suspension component 24 and the earstem 34 can both be pivotally attached to the frame and have separate or a common pivot axis. However, in some embodiments, the suspension component 24 and the earstem 34 can be coupled or attached at a plurality of discrete points (e.g., two).

For example, the two coupling or attachment points can be positioned intermediate an end of the anterior portion 70 and an end of a posterior portion 72 of the earstem 14. Thus, the earstem 34 can attach to the suspension component 24 at two locations and therefore be coupled indirectly to the frame 16. In such an embodiment, the earstem 34 can have two pivot axes, a first that is the pivot axis between the suspension component 24 and the frame 16, and a second that is the pivot axes between the earstem 34 and a suspension component 24. In such embodiments, the suspension component 24 and the earstem 14 can be coupled or attached to each other at two points that are separated from each other along the length of the suspension component 24.

As discussed below, according to the configuration illustrated in the embodiment shown in FIGS. 1-5 and others disclosed herein, the earstem assembly can be configured to allow the suspension component 24 to deflect relative to the earstem 34, which can allow the earstem 34 to dynamically deflect for accommodating a variety of head sizes and shapes. In other words, the deflection of the earstem 34 from a deployed position (shown in FIG. 4A) to a deflected position (shown in FIG. 4B) can produce a spacing or separation between the earstem 34 and the suspension component 24. Such a deflection and spacing can result from the configuration of the earstem 34 and the relationship between the spacing of attachment points of the suspension component 24 and the earstem 34 and the length of the suspension component 24 and earstem 34.

Figure 4B:
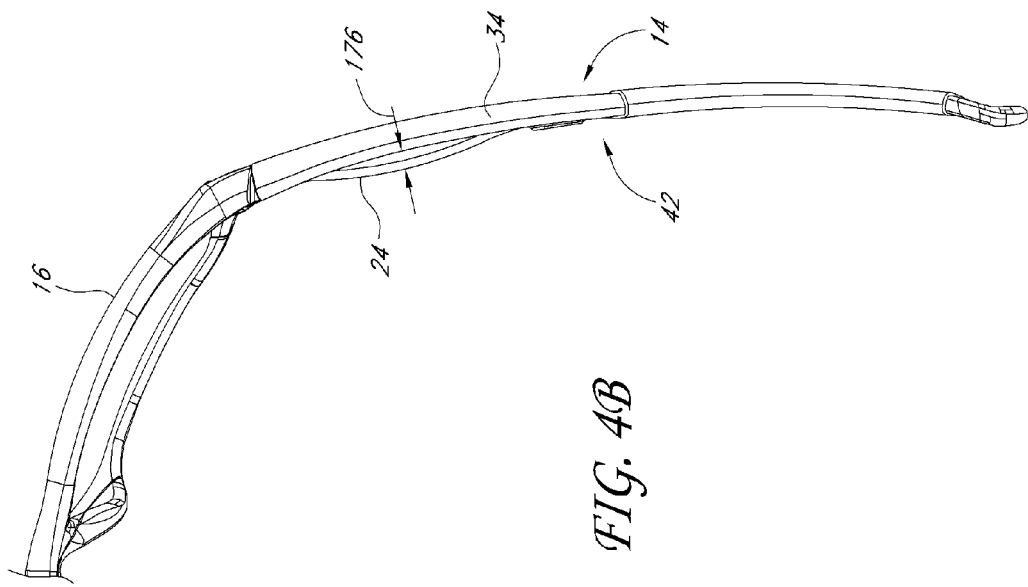
FIG. 4B is a top view of the eyeglass illustrated in FIG. 1, wherein the earstem assembly thereof is in a deflected position.
Figure 15:
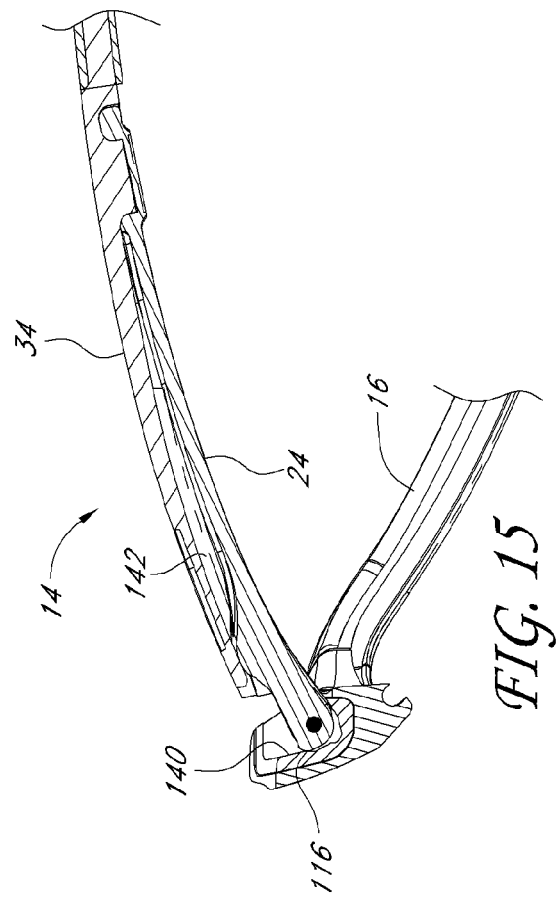
FIG. 15 is a cross-sectional top view of the earstem assembly of the eyeglass illustrated in FIG. 1, wherein the earstem assembly is in a stowed position.

With regard to the deflection of the suspension component 24, FIG. 3 illustrates that the suspension component 24 can be coupled to the earstem 34 at the anterior portion 40 and the posterior portion 42 of the suspension component 24. In this manner, the length of the suspension component 24 disposed between the attachment points can deflect relative to the earstem 34 as needed. For example, FIGS. 13-15 illustrate the suspension component 24 deflecting inwardly toward the earstem 34. Further, FIGS. 4B and 17-18 illustrate the suspension component 20 for deflecting outwardly away from the earstem 34.

Further, as mentioned above, the spacing or separation distance of the attachment points between the suspension component 24 and the earstem 34 can affect the degree of deflection of the suspension component 24 from the earstem 34. The spacing can therefore also affect the degree of deflection or fit of the earstem assembly 14 when the eyeglass 10 is worn by a user. Some embodiments disclosed herein reflect the realization that when the spacing or distance of the attachment points (as measured in a straight line) is less than the length of the suspension component 24 between the attachment points, the suspension component 24 can deflect relative to the earstem 34. Further, the relationship between the spacing of the attachment points in the length of the suspension component 24 can be optimized to provide a desired degree of deflection or stiffness of the earstem assembly 14 when worn by a user. Further, the design of the earstem 34 can also be modified to optimize the interaction between the earstem 34 and the suspension component 24 to affect the deflection and function of the suspension component 24.

Figure 4A:
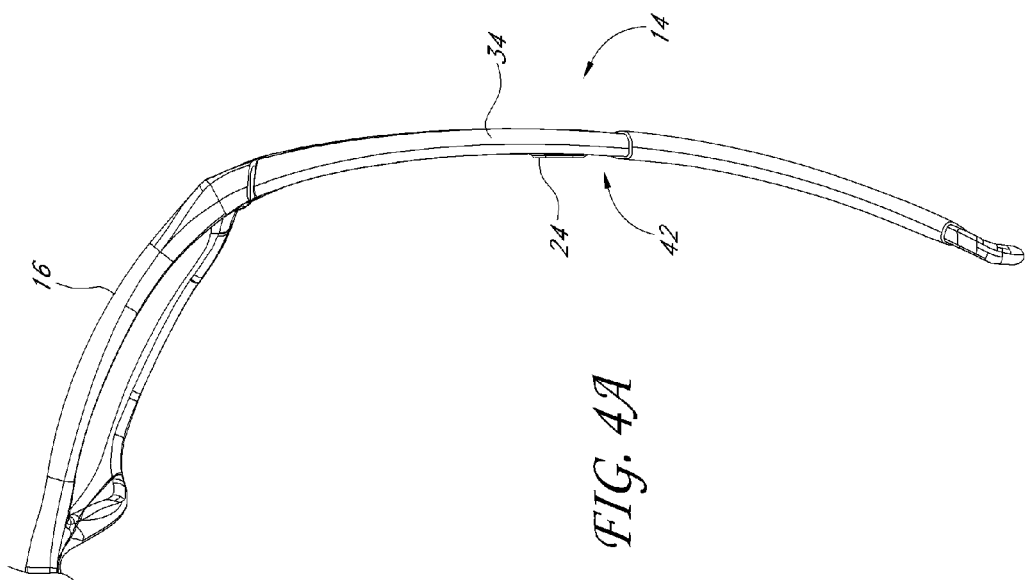
FIG. 4A is a top view of the eyeglass illustrated in FIG. 1, wherein an earstem assembly thereof is in a deployed position.

FIG. 4A illustrates a top view of the eyeglass 10 wherein the earstem assembly 14 is shown in a deployed position. The deployed position is achieved when the earstem assembly 14 is pivoted outwardly away from the frame 16 until reaching a predetermined stop position, or a position at which further deflection requires a substantially larger force. In some embodiments, the deployed position of the eyeglass 10 can be achieved when the earstem assembly 14 reaches a rotational position that is limited by interference between structures of the frame 16 and the earstem assembly 14. As shown in FIG. 4B, and as described further herein, although the earstem assembly 14 reaches the maximum angular or deployed position, the interaction between the suspension component 24 and the earstem 34 can allow the earstem 34 to deflect beyond the deployment position shown in FIG. 4A. In other words, although the suspension component 24 can resist further rotation, the suspension component 24 can deflect relative to the frame 16 in order to allow the earstem 34 of the earstem assembly 14 to pivot further beyond the deployed position relative to the frame 16 to a deflected position. These principles are also shown and described further below, and especially with respect to FIGS. 17-18.

As shown in FIGS. 1-2 and 4, the earstem assemblies 12, 14 can also be configured to appear as singular, integrated units when the eyeglass is worn. In this regard, when the earstem assemblies 12, 14 are viewed from the side or top, the suspension components 22, 24 can be positioned on the medial side of the earstem and nested within, or generally flush with the top and side profiles of, the earstems 32, 34. Thus, the appearance of the earstem assemblies 12, 14 is clean and simple. Accordingly, in the deployed or stowed position, the suspension components 22, 24 can be hid or received within cavities of the earstems 32, 34. Although FIG. 4 illustrates that the posterior portions 76, 42 of the respective suspension components 22, 24 are visible from above, the coupling or attachment mechanism or structure can be flush or inconspicuous relative to the respective earstem 32, 34. In this manner, the eyeglass 10 can provide advantageous functional qualities without exposing the suspension components 22, 24 and without detracting from the aesthetic design of the eyeglass frame.

Turning now to FIGS. 5-6, an embodiment of the earstem 34 is illustrated. As discussed above, the earstem 34 can comprise anterior and posterior portions 70, 72. Further, the earstem 34 can comprise a cavity or recess 80 formed along the anterior portion 70 thereof. The cavity 80 can be configured to accommodate at least a portion of the corresponding suspension component 24. Further, the cavity 80 can extend up to a medial section 82 of the earstem 34. The cavity 80 can have a depth sufficient to provide a space between an interior surface of the cavity 80 and an outer surface of the suspension component 24 that opposes the interior surface of the cavity 80. In this regard, the spacing between the interior surface of the cavity 80 and the suspension component 24 can be selectively modified to achieve a desired articulation or deflection of the suspension component 24. In this manner, the fit and feel of the eyeglass 10 can be customized. For example, a user can insert interchangeable earstems in order to optimize and personalize the fit and feel of the eyeglass.

Therefore, in some embodiments, a central section of the suspension component can be separated from, or not securely fastened to, the interior or medial surface of the earstem, or cavity within the earstem, when the earstem assembly is in the deployed position. This separation can be advantageous because the suspension component can be deflected in either direction, thus creating a slight resistance or dampening to motion of the earstem. As the earstem is moved beyond the deployed position into the deflected position, the distance of separation between the central section of the suspension component and the interior or medial surface of the earstem can increase, causing the suspension component to become arcuately shaped in the deflected position, as illustrated.

As also illustrated, the earstem 34 can comprise an attachment section 84 that can be configured to facilitate attachment or coupling between the suspension components 24 and the earstem 34. In the illustrated embodiment, the attachment section 84 comprises a plurality of attachment points (e.g., screw holes formed in the earstem 34, that are configured to receive screws 62 passed through recesses or apertures of the suspension component 24) for attaching the posterior portion 42 thereof to the earstem 14. In this regard, the attachment section 84 can correspond to one of the attachment points between the earstem 34 and the suspension component 24. As illustrated, the attachment section 84 can comprise a fixed attachment point at which relative movement between the earstem 34 and the suspension component 24 is restricted. However, it is contemplated that in some embodiments, the attachment section 84 can comprise a slidable or otherwise movable joint between the suspension component 24 and the earstem 34. For example, the attachment section 84 can comprise a sleeve or grooves disposed on a medial side of the earstem 34 into which at least a portion of the suspension component 24 is received for interconnecting the suspension component 24 and the earstem 34 at a joint, whether fixed or moveable. In some embodiments, the suspension component 24 can slide into a sleeve, cavity, groove, or aperture coupled to or formed in the earstem 34 in order to be retained relative to the earstem 34. The earstem assembly 14 can provide an adjustable and personalized articulation.

In addition, the earstem 34 can comprise a rotational coupling section 90 that is formed along the anterior portion 70 of the earstem 34. The coupling section 90 can correspond to another one of the attachment points between the earstem 34 in the suspension member 24. The illustrated embodiment of the rotational coupling section 90 provides an upper recess 92 and a lower recess 94 formed along the interior of the cavity 80. The upper and lower recesses 92, 94 can be generally arranged to form a pivot axis 96. As shown, the pivot axis 96 is oriented transversely relative to a vertical axis. The orientation of the pivot axis 96 can be selected to provide unique articulative properties. In this manner, the axis 96 can be arranged to be vertical or non-vertical, in order to achieve a desirable deflection and rotation angle of the earstem 14.

Referring now to FIGS. 7-9, an embodiment of the suspension component 24 is shown. FIG. 7 illustrates a perspective view of the suspension component 24 illustrating the anterior and posterior portions 40, 42 wherealong the first and second attachment or coupling points can be formed between the suspension component 24 and the earstem 34. As shown, the suspension component 24 can comprise the apertures 60 that can form an attachment or coupling point with the earstem 34. As noted above, the apertures 60 can be configured to receive one or more mechanical fasteners that interconnect the posterior portion 42 with the attachment section 84.

In addition, the suspension component 24 can comprise upper and lower protrusions 100, 102 that can engage with the earstem 34 to form another attachment or coupling point. The upper and lower protrusions 100, 102 can be configured to be received within the upper and lower recesses 92, 94 of the coupling section 90 of the earstem 34. In this regard, while the apertures 60 can form a generally static or fixed coupling between the suspension component 24 and the earstem 34, the upper and lower protrusions 100, 102 can form a moveable joint with the earstem 34. In some embodiments, the upper and lower protrusions 100, 102 can form a pivot joint with the earstem 34. The pivotability of the earstem 34 about the upper and lower protrusions 100, 102 can cause the suspension component 24 to deflect which can allow the earstem 34 to deflect relative to the frame 16 further beyond the deployed position to a deflected position, as shown in FIGS. 4B and 17.

In the illustrated embodiment of the suspension component 24, the upper and lower protrusions 100, 102 are illustrated as being offset. In this regard, the upper and lower protrusions 100, 102 can form a pivot axis 104 that can be generally aligned with the pivot axis 96 of the earstem 34. As noted above, the alignment and orientation of the pivot axes 96, 104 can be adjusted to provide a desired earstem articulation, such as deflection and rotation angle. For example, the upper and lower protrusions 100, 102 can lie along a common vertical axis (similar to the spherical heads of the upper and lower connectors 112, 114 discussed below).

Further, FIG. 9 also illustrates that the suspension component 24 can comprise a protrusion 116 formed along the anterior portion 40 thereof. The protrusion 116 can interact with an interior surface or structure of the end 46 of the frame 16 in order to influence the articulation of the earstem assembly 14. These features and functions are described further herein. The length of the suspension component can be at least about ½ inch and/or less than or equal to about 5 inches. In some embodiments, the length of the suspension component can be at least about 1 inch and/or less than or equal to about 4 inches. Further, in some embodiments, the length of the suspension component can be at least about 2 ½ inches.

As also illustrated in FIGS. 7-9, the suspension component 24 can be configured such that the anterior portion 40 can be pivotally coupled to the frame 16. In this regard, the anterior portion 40 can comprise a fork-shaped coupling 110 having upper and lower connectors 112, 114 with protrusions that can engage the frame 16. The connectors 112, 114 can define a pivot axis. For example, the protrusions of the upper and lower connectors 112, 114, which are illustrated as spherical heads, can define a vertical pivot axis. In the illustrated embodiment, the pivot axis of the connectors 112, 114 can be transversely aligned relative to the pivot axis 104 of the protrusions 100, 102. The fork-shaped coupling 110 can be configured to allow the connectors 112, 114 to deflect toward each other in order to fit the coupling 110 into engagement with the end 46 or receptacle 50 of the frame 16.

Figure 10:
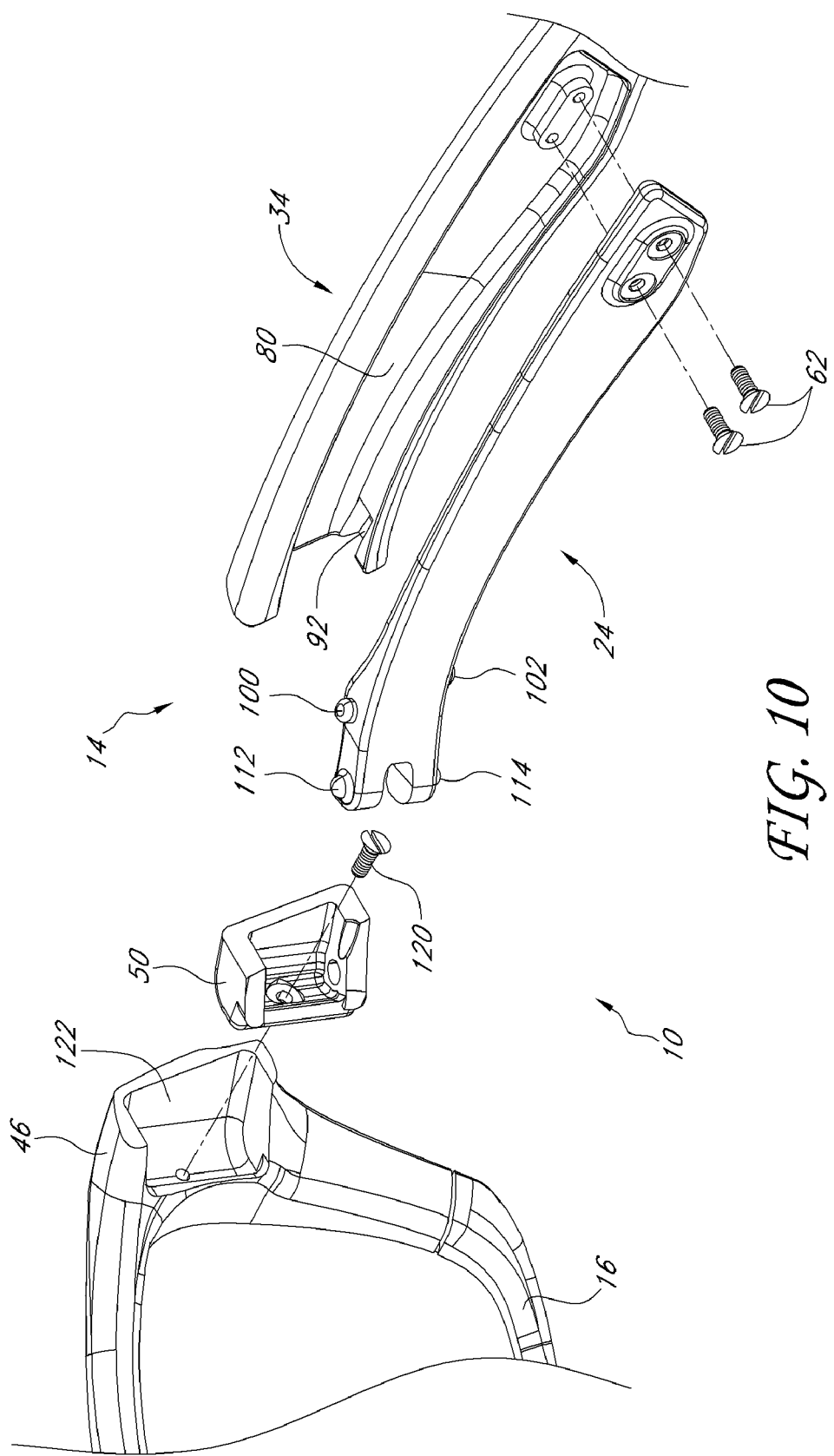
FIG. 10 is an exploded view of the flexible elongate body or suspension component and a receptacle of a frame of the eyeglass shown in FIG. 1.

For example, FIG. 10 shows an exploded perspective view of components of the eyeglass 10. In this figure, the earstem 34 is separated from the suspension component 24, which is removed from connection with the receptacle 50 of the frame 16. Further, the receptacle 50 and a fastener 120 or screw are shown as being detached from a cavity 122 formed in the end 46 of the frame 16. Thus, in order to assemble the eyeglass, the receptacle 50 it is attached to the frame 16. Further, the upper and lower protrusions 100, 102 of the suspension component 24 can be aligned with and received in the upper and lower recesses 92, 94 of the earstem 34. Furthermore, the screws 62 can be used to attach the posterior portion of the suspension component 24 to the earstem 34. Finally, the upper and lower connectors 112, 114 can be inserted into the receptacle 50 to attach the earstem assembly 14 to the frame 16. The unique configuration of the earstem assembly 14 allows the earstem 34 to be urged to a deflected position upon further exertion of force when in the deployed position.

Figure 11:
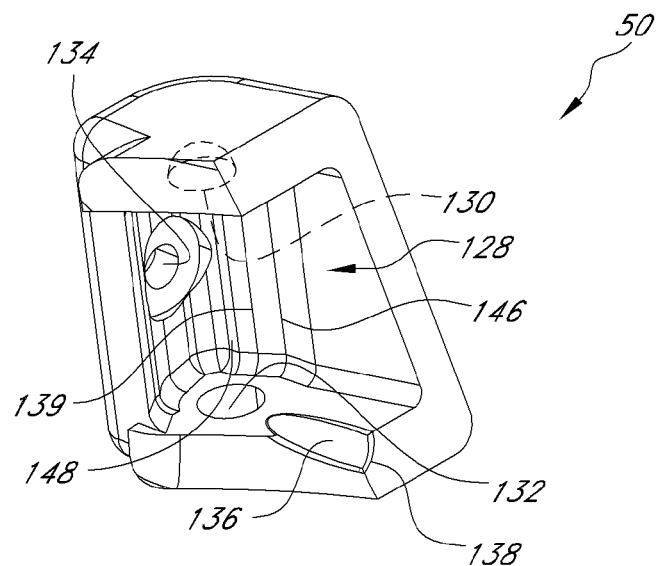
FIG. 11 is an enlarged rear perspective view of the receptacle illustrated in FIG. 10.

FIG. 11 is an enlarged perspective view of the receptacle 50 shown to illustrate further features of such an embodiment. The receptacle 50 can comprise an earstem connection portion 128. The earstem connection portion 128 can be configured to receive and/or mate with the earstem assembly 12 for securing the earstem assembly 12 relative to the frame 16. The earstem connection portion 128 can comprise a variety of different structures, such as a hinge pin with a thru hole, a hinge pin with one-time snap, protrusions extending from the earstem assembly 12 that mate with corresponding recesses in the receptacle 50, protrusions extending from the receptacle 50 that mate with corresponding recesses in the earstem assembly 12, combinations thereof, and the like. Further, the structure(s) of the earstem connection portion 128 can be formed monolithically with the earstem connection portion 128 and/or can be formed separately from the earstem connection portion 128. For example, the earstem connection portion 128 can comprise a hinge pin, which can be metal or non-metallic.

As illustrated in FIG. 11, the earstem connection portion 128 can comprise upper and lower indentations 130, 132 configured to receive or mate with the respective upper and lower connectors 112, 114 of the coupling 110 of the suspension component 24. The indentations 130, 132 can define a pivot axis that is substantially coaligned with the pivot axis of the connectors 112, 114 upon mating of the indentations 130, 132 and the connectors 112, 114. In the illustrated embodiment, the pivot axes can be generally vertical to allow the earstem assembly 14 to pivot relative to the frame between the stowed and deployed positions. Further, the receptacle 50 can comprise an aperture 134 configured to receive a fastener or screw for attaching the receptacle 50 to the frame 16.

In addition, the receptacle 50 can comprise a guide track 136 that can allow self-aligning of the connectors 112, 114 as the coupling 110 of the suspension component 24 is urged into engagement with the receptacle 50. The guide track 136 can comprise a recess or indentation having a variable depth relative to an interior surface of the receptacle 50. A lower guide track is shown in FIG. 11, but an upper guide track can also or alternatively be provided. In some embodiments, the guide track 136 can extend deeper towards a peripheral end 138 thereof.

Furthermore, the eyeglass can also incorporate a biasing mechanism. For example, FIG. 11 also illustrates that the receptacle 50 can comprise one or more recesses or indentations that can interact with the protrusion 116 of the suspension component 24 to influence the articulation of the earstem assembly 14. As illustrated, the interior surface or structure of the receptacle 50 can comprise a protruding section 139 and first and second recess sections 146, 148. As discussed further below, the protruding section 139 can contact or engage the protrusion 116 of the suspension component 24 to urge or bias the protrusion 116 into one of the first and second recess sections 146, 148. Thus, rotation of the suspension component 24 when fitted into the receptacle 50 can cause interference between the protrusion 116 and the protruding section 139. However, the first and second recess sections 146, 148 can be configured to receive the protrusion 116, thereby representing respective stowed and deployed positions of the suspension component 24.

Figure 12:
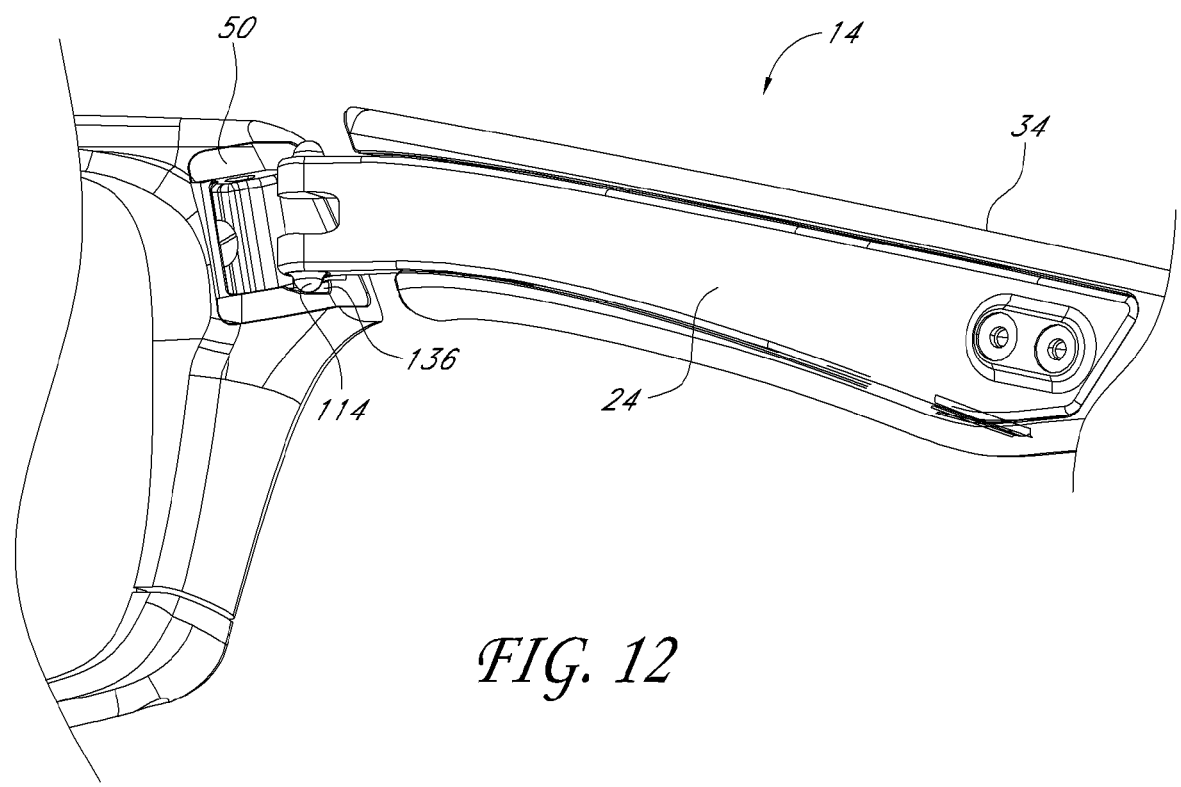
FIG. 12 is a rear perspective view of the earstem assembly being fitted into the receptacle, according to an embodiment.

As shown in FIG. 12, the connectors 112, 114 can catch or be received within the guide track 136 and as the connectors 112, 114 are advanced toward the indentations 130, 132, the connectors 112, 114 are deflected inwardly from undeflected positions toward each other until rebounding to their undeflected positions upon engaging the indentations 130, 132. In this manner, the connectors 112, 114 can be securely received into the indentations 130, 132 of the receptacle 50 in order to maintain secure engagement between the suspension component 24 and the frame 16.

Further, the eyeglass can incorporate a breakaway mechanism. For example, the connectors 112, 114 can be configured such that upon exertion of sufficient force, the coupling 110 can be dislodged or removed from the receptacle 50. In this manner, embodiments of the eyeglass may have not only the robust qualities and stiffness associated with rigid materials, but the eyeglass can also be resilient, durable, and avoid failure when stresses or other forces are exerted on the eyeglass. Accordingly, a user can enjoy the benefits of a rigid frame and earstem combination as well as a yielding earstem joint that will decouple without breaking.

Referring now to FIGS. 13-15, the articulation of the earstem assembly 14 is illustrated from the deployed position (FIG. 13), to an intermediate position (FIG. 14A) and to the stowed position (FIG. 15) upon exertion of a force F. These cross-sectional top views illustrate the interaction of the coupling 110 of the suspension component 24 with an interior surface 140 of the receptacle 50. The configuration of the coupling 110 and the interaction between the coupling 110 and the interior surface 140 of the receptacle 50 facilitate a "rebound" action for the earstem assembly 14 to one of the stowed or deployed positions. In other words, when rotating the earstem assembly 14 to open or deploy the earstem assembly 14, the earstem assembly 14 will initially resist movement from the stowed position, but upon reaching the intermediate position, the earstem assembly 14 will generally move or accelerate toward the deployed position. Similarly, when rotating the earstem assembly 14 to close or stow the earstem assembly 14, the earstem assembly 14 will initially resist movement from the deployed position, but upon reaching the intermediate position, the earstem assembly 14 will generally move or accelerate toward the stowed position.

In some embodiments, as discussed below, the coupling 110 can comprise a projection 116 that creates interference during rotation of the earstem assembly 14. However, the interior surface 140 of the receptacle 50 can be configured such that the projection 116 can be accommodated without resistance when the coupling 110 is oriented in one of the stowed or deployed rotational orientations. Thus, the projection 116 can encounter resistance during rotation when the rotational alignment is between that of the stowed and deployed rotational orientations. A suitable projection can also be located on the receptacle 50 and a projection engaging surface (such as a recess) can be provided on the earstem.

Figure 14B:
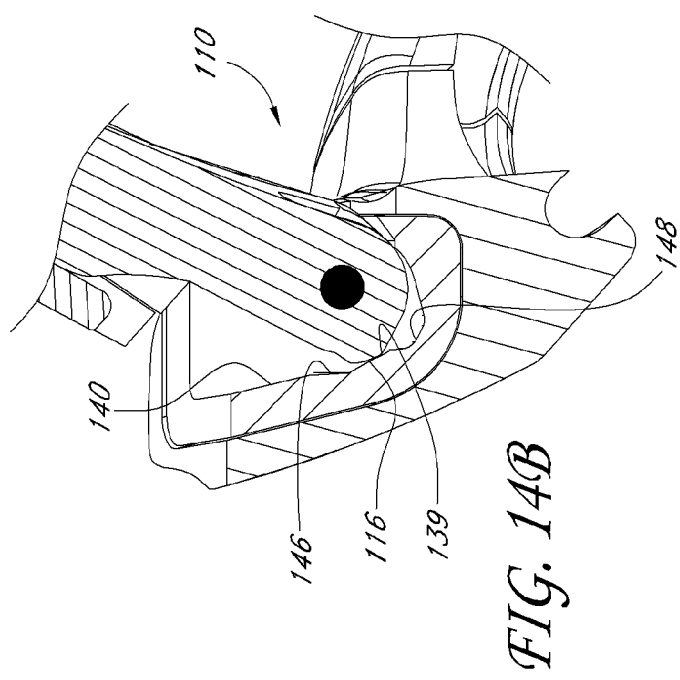
FIG. 14B is an enlarged cross-sectional top view of the joint formed between the suspension component and the receptacle of the eyeglass illustrated in FIG. 1, wherein the earstem assembly is oriented in the intermediate position.

As illustrated in FIG. 14B, the interior surface or structure of the receptacle 50 can comprise the protruding section 139 and the first and second recess sections 146, 148. The protruding section 139 can contact or engage the protrusion 116 of the suspension component 24 to urge or bias the protrusion 116 into one of the first and second recess sections 146, 148. Thus, the projection 116 encounters resistance during rotation from the deployed position shown in FIG. 13 to the stowed position shown in FIG. 15. In this regard, the configuration of the protruding section 139 and the first and second recess sections 146, 148 can be configured to "tune" the resistance and biasing of the suspension component 24. As noted previously, the first and second recess sections 146, 148 can be configured to receive the protrusion 116, thereby representing respective stowed and deployed positions of the suspension component 24.

In addition, as the earstem assembly 14 undergoes the initial resistance and rebound to or from one of the stowed or deployed positions, the suspension component 24 can assist in providing a more fluid movement. As noted, various embodiments can be configured such that the posterior portion 42 of the suspension component 24 can deflect relative to the anterior portion 40 thereof. Thus, even if the suspension component 24 is not rotating, the suspension component 24 can deflect.

Accordingly, when the projection 116 of the suspension component 24 engages the interior surface 140 of the receptacle 50, rotation of the anterior portion 40 of the suspension component 24 can be inhibited, but the posterior portion 42 of the suspension component 24 can still deflect. The earstem 34 can be coupled to the suspension component 24 as described above, thereby allowing the earstem 34 to move in a constant fluid motion—albeit with dynamic resistance—that is influenced by the interaction of the projection 116 and the interior surface 140 of the receptacle 50. As a result, jerking or uneven motions of the earstem assembly 14 can be reduced and/or eliminated as the earstem assembly 14 is opened or closed.

During movement of the earstem assembly 14 from the deployed position to the stowed position, the suspension component 24 can flex inwardly into a space 142 formed between an interior surface of the cavity of the earstem 34 and the suspension component 24. An illustration of this action is shown in FIG. 14A. It can contribute to the fluidity of the motion as the earstem assembly 14 rotates. Further, this deflection of the suspension component 24 into the recess of the earstem 34 can also result in rotational movement of the earstem 34 relative to the suspension component 24 about the pivot axis formed between the upper and lower protrusions of the suspension component 24 and the upper and lower recesses of the earstem 34.

FIG. 15 illustrates the earstem 34 in the stowed position. In some embodiments, when the earstem 34 is moved to the stowed position, the earstem assembly 14 can be configured to avoid contacting the frame 16 of the eyeglass 10. For example, the earstem 34 can be restrained from further motion beyond the stowed position that would otherwise result in contact between the posterior section of the earstem 34 and the frame 16. In some embodiments, the suspension component 24 can bias the earstem 34 toward the stowed position and away from contact with the frame 16. The suspension component 24 can absorb momentum forces from the earstem 34 as the earstem 34 approaches the stowed position from the deployed position. For example, the suspension component 24 can deflect into the cavity of the earstem 34 to dampen and provide resistance to further movement of the earstem 34 toward the frame 16 from the stowed position.

FIGS. 16-17 illustrate cross-sectional top views of the earstem assembly 14 in the deployed position (shown in FIG. 16 in solid lines, and in FIG. 17 in dashed lines) and in the deflected position (shown in FIG. 17 in solid lines). As discussed above, the earstem 34 can be coupled to the suspension component 24 at a plurality of points, e.g. two distinct points, as shown in FIGS. 16-17. With reference to FIG. 16, the earstem 34 can be coupled to the suspension component 24 at a first point 150. In some embodiments, the earstem 34 can be rotatably coupled to the suspension component 24 at the first point 150. Further, the earstem 34 can be fixed or statically coupled to the suspension component 24 at a second point 152. Finally, the suspension component 24 can be pivotally coupled to the frame 16 at a third point 156.

When comparing the deployed and deflected positions of FIGS. 16-17, the suspension component 24 does not rotate about the third point 156 beyond the deployed position. In this regard, in some embodiments, the suspension component 24 only rotates about the third point 156 during rotation of the earstem assembly 14 from the stowed position to the deployed position and vice-versa.

In some embodiments, rotation can occur about the first point 150. In this regard, a rotational coupling of the earstem 34 to the suspension component 24 at a location posterior to the third point 156 can facilitate deflection of the earstem 34 from the deployed position (FIG. 16) to the deflected position (FIG. 17). The rotatable coupling between the earstem 34 and the suspension component 24 at the second point 154 further facilitate over-rotation or deflection of the earstem 34 to the deflected position.

As illustrated in FIG. 17, the earstem 34 can deflect by a given deflection angle 170. The deflection angle 170 of the earstem 34 can be at least about 5 degrees and/or less than or equal to about 45 degrees. In some embodiments, the deflection angle 170 of the earstem 34 can be at least about 15 degrees and/or less than or equal to about 30 degrees. Further, in some embodiments, the deflection angle 170 of the earstem 34 can be at least about 23 degrees. Additionally, if the deflection of the earstem 34 is measured at the posterior end of the earstem 34, a deflection distance 172 of the earstem 34 can be at least about ¼ inch and/or less than or equal to about 2 inches. In some embodiments, the deflection distance 172 of the earstem 34 can be at least about 1¾ inch and/or less than or equal to about 1¾ inches if measured at the posterior end of the earstem 34. Further, in some embodiments, the deflection distance 172 of the earstem 34 can be at least about 1½ inch if measured at the posterior end of the earstem 34.

Additionally, the deflection can also be measured based on the deflection of the suspension component when in the deployed position. For example, referring to FIG. 4, the suspension component 24 can be deflected at a deflection distance 176. The deflection distance 176 of the suspension component 24 can be at least about 1/16 inch and/or less than or equal to about 1/2 inch. In some embodiments, deflection distance 176 of the suspension component 24 can be at least about 1/8 inch and/or less than or equal to about 1/4 inch. Further, in some embodiments, the deflection distance 176 of the suspension component 24 can be at least about 3/8 inch. In some embodiments, the deflection distance 176 is at least about as large as the thickness of the suspension component and/or less than or equal to about the thickness of the earstem (e.g., the distance between the lateral and medial surfaces of the earstem).

In some embodiments, the anterior portion of the earstem 34 and the anterior portion of the suspension component can each define a generally curved or arcuate geometry. For example, at least one of the anterior portion of the earstem 34 and the anterior portion of the suspension component can have an arc of curvature 174 of at least about 1 inch and/or less than or equal to about 8 inches. In some embodiments, at least one of the anterior portion of the earstem 34 and the anterior portion of the suspension component can have an arc of curvature 174 of at least about 3 inches and/or less than or equal to about 6 inches. In some embodiments, at least one of the anterior portion of the earstem 34 and the anterior portion of the suspension component can have an arc of curvature 174 of at least about 4½ inches and/or less than or equal to about 5½ inches. In some embodiments, the arc of curvature 174 of at least one of the anterior portion of the earstem 34 and the anterior portion of the suspension component can be constant; however, the arc of curvature 174 can also vary along the length of the earstem 34 and/or suspension component. Further, in some embodiments, the earstem 34 can be generally straight and the suspension component can be curved. As a result, some embodiments allow the suspension component to deflect relative to the earstem into a recess or cavity of the earstem while the earstem has a generally straight configuration. Thus, the length of the suspension component 24 can be modified relative to the distance between the attachment points, as discussed above, in order to control the amount and/or degree of deflection of the earstem 34.

Further, as noted above, the various components of the eyeglass 10 can be fabricated from a variety of materials and in a variety of ways, including comolding, overmolding, and the like. For example, the frame 16 and the earstems 32, 34 can be fabricated from a rigid material while the suspension components 22, 24 can be fabricated from a resilient, flexible material. In addition, the receptacle 50 can also be fabricated from a resilient, flexible material. However, in addition to varying the material properties of these components, an interchangeable system of components can be provided by which a user is able to adjust the articulation of the eyeglass 10. A variety of suspension components can be provided that have combinations of lengths, thicknesses, and configurations for the coupling section 110 and protrusion 116. In this manner, a user can personalize their eyeglasses according to their wants and needs.

Furthermore, certain portions of the earstems 32, 34, such the posterior portions thereof can be formed of a material that is bendable to a given shape while retaining elastic properties. For example, such an embodiment could utilize comolding or overmolding such that the earstems 32, 34 exhibit variable properties along the lengths thereof. In this regard, the posterior half or posterior portion of the elongate body or spine can be bended by the wearer in order to further customize the fit of the eyeglass.

Although embodiments of these inventions have been disclosed in the context of certain examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions.

What is claimed is:

1. An eyeglass earstem assembly comprising:
   a flexible suspension component having an anterior end and a posterior end, the anterior end of the suspension component being pivotally coupled relative to an eyeglass frame, the flexible suspension component providing resistance against rotation relative to the eyeglass frame upon reaching a deployed position; and
   a rigid elongate body having an anterior end and a posterior end, the anterior end of the rigid elongate body being pivotally coupled to the flexible suspension component, the rigid elongate body and the suspension component being attached to each other at a point posterior to the anterior ends of the rigid elongate body and the suspension component, the rigid elongate body being operative to rotate relative to the eyeglass frame beyond the deployed position;
   wherein upon rotation of the rigid elongate body beyond the deployed position, the attachment between the rigid elongate body and the flexible suspension component causes deflection of the flexible suspension component which dampens further rotation of the rigid elongate body relative to the eyeglass frame.

2. An earstem assembly as in claim 1, wherein the posterior end of the flexible suspension component is coupled to the rigid elongate body.

3. An earstem assembly as in claim 2, wherein the flexible suspension component is approximately half the length of the rigid elongate body.

4. An earstem assembly as in claim 1, wherein the flexible suspension component is pivotally coupled to the eyeglass frame.

5. An earstem assembly as in claim 1, wherein the rigid elongate body is pivotally coupled to the flexible suspension component adjacent the anterior end thereof.

6. An earstem assembly as in claim 1, wherein the flexible suspension component indirectly couples the rigid elongate body to the eyeglass frame.

7. An earstem assembly as in claim 1, wherein the anterior end of the suspension component is configured to engage a portion of the eyeglass frame to limit relative rotation thereof.

8. An earstem assembly as in claim 7, wherein the anterior end of the flexible suspension component comprises a projection for biasing the earstem assembly toward either a stowed position or the deployed position.

9. An earstem assembly as in claim 8, wherein the anterior end of the flexible suspension component forms a coupling with the eyeglass frame, the coupling configured to provide resistance against the projection during rotation of the earstem assembly between the stowed position and the deployed position and to bias the earstem assembly toward either a stowed position or the deployed position.

10. An earstem assembly as in claim 9, further comprising a receptacle attached to the eyeglass frame, wherein the coupling comprises a protruding section and a pair of recesses formed in the receptacle and configured to receive the projection of the flexible suspension component for biasing the earstem assembly toward either the stowed position or the deployed position.

11. An earstem assembly as in claim 9, further comprising a receptacle attached to the eyeglass frame, wherein the coupling comprises a protruding section and a pair of recesses formed in the receptacle and configured to receive the projection of the flexible suspension component for biasing the earstem assembly toward either the stowed position or the deployed position.

12. An earstem assembly as in claim 1, wherein the suspension component and the rigid elongate body define a generally arcuate shape.

13. An earstem assembly as in claim 1, wherein the suspension component is configured to increasingly dampen rotation of the rigid elongate body upon continued rotation beyond the deployed position.

14. An earstem assembly as in claim 1, wherein the rigid elongate body can rotate beyond the deployed position to a deflected position.

15. An earstem assembly as in claim 14, wherein rotation of the rigid elongate body is constrained upon reaching the deflected position.

16. An earstem assembly as in claim 1, wherein the flexible suspension component comprises upper and lower protrusions disposed at the anterior end of the flexible suspension component, the upper and lower protrusions being configured to pivotally couple the flexible suspension component relative to the eyeglass frame.

17. An earstem assembly for eyeglasses comprising:
a flexible elongate body having an anterior end and a posterior end, the anterior end being pivotally coupled to the frame at a first pivot point; and
a rigid elongate body pivotally coupled to the flexible elongate body adjacent to the anterior end thereof at a second pivot point, the rigid elongate body being coupled to the flexible elongate body at a point posterior to the anterior end of the flexible elongate body;
wherein the rigid elongate body can be rotated about the second pivot point to move from a deployed position to a deflected position.

18. An earstem assembly as in claim 17, wherein an anterior portion of the rigid elongate body is curved.

19. An earstem assembly as in claim 17, wherein the flexible elongate body is positioned adjacent to the rigid elongate body in the deployed position, and the flexible elongate body is separated from the rigid elongate body along at least a portion thereof in the deflected position.

20. An earstem assembly as in claim 17, wherein the flexible elongate body is constrained against rotation when the rigid elongate body moves from the deployed position to the deflected position.

21. An earstem assembly as in claim 17, wherein the posterior end of the flexible elongate body is coupled to the rigid elongate body at approximately a midpoint of the rigid elongate body.

22. An earstem assembly as in claim 17, wherein the flexible elongate body comprises upper and lower protrusions disposed at the anterior end thereof, the upper and lower protrusions being configured to pivotally couple the flexible elongate body relative to the frame.

23. An earstem assembly as in claim 17, wherein the anterior end of the flexible suspension component comprises a projection for biasing the earstem assembly toward either a stowed position or the deployed position.

24. An earstem assembly as in claim 23, wherein the anterior end of the flexible suspension component forms a coupling with the frame, the coupling configured to provide resistance against the projection during rotation of the earstem assembly between the stowed position and the deployed position and to bias the earstem assembly toward either a stowed position or the deployed position.

25. An eyeglass comprising:
a frame;
a pair of earstem assemblies coupled to and extending from the frame, each earstem assembly comprising a suspension component and a rigid elongate body, the suspension component being pivotally coupled to the frame at a first point and to the rigid elongate body at a second point, the suspension component being operative to pivot relative to the frame until reaching a deployed position, the rigid elongate body being operative to pivot relative to the suspension component and the frame beyond the deployed position upon application of increased force, the suspension component being attached to the rigid elongate body along a posterior portion of the suspension component at a third point such that pivoting of the rigid elongate body beyond the deployed position causes deflection of the suspension component to dampen further pivoting of the rigid elongate body.

26. An eyeglass as in claim 25, wherein the suspension component is pivotally coupled to the eyeglass frame.

27. An eyeglass as in claim 25, wherein the rigid elongate body is pivotally coupled to the suspension component adjacent an anterior end of the suspension component.

28. An eyeglass as in claim 25, wherein an anterior end of the suspension component is configured to engage a portion of the frame to limit relative rotation thereof.

29. An eyeglass as in claim 25, wherein the frame is configured to support dual lenses.

30. An eyeglass as in claim 29, wherein the frame comprises full orbitals configured to support dual lenses.

31. An eyeglass as in claim 25, wherein the suspension component comprises upper and lower protrusions disposed at an anterior end thereof, the upper and lower protrusions being configured to pivotally couple the suspension component relative to the frame.

32. An eyeglass as in claim 25, wherein an anterior end of the suspension component comprises a projection for biasing the earstem assembly toward either a stowed position or the deployed position.

33. An eyeglass as in claim 32, wherein the anterior end of the suspension component forms a coupling with the frame, the coupling configured to provide resistance against the projection during rotation of the earstem assembly between the stowed position and the deployed position and to bias the earstem assembly toward either a stowed position or the deployed position.

34. An eyeglass as in claim 33, further comprising a receptacle attached to the frame, wherein the coupling comprises a protruding section and a pair of recesses formed in the receptacle and configured to receive the projection of the suspension component for biasing the earstem assembly toward either the stowed position or the deployed position.

* * * * *

UNITED STATES PATENT AND TRADEMARK OFFICE
CERTIFICATE OF CORRECTION

| | | |
|---|---|---|
| PATENT NO. | : 8,020,988 B2 | Page 1 of 1 |
| APPLICATION NO. | : 12/614342 | |
| DATED | : September 20, 2011 | |
| INVENTOR(S) | : Steven Ogren and Ryan Anthony Calilung | |

It is certified that error appears in the above-identified patent and that said Letters Patent is hereby corrected as shown below:

At column 16, Line 63, please change "1¾" to --¾--.

Signed and Sealed this
Twelfth Day of June, 2012

David J. Kappos
*Director of the United States Patent and Trademark Office*